United States Patent [19]

O'Malley

[11] Patent Number: 4,559,192
[45] Date of Patent: Dec. 17, 1985

[54] APPARATUS AND METHOD FOR THE MANUFACTURE OF MOLDED PACKINGS

[75] Inventor: Michael P. O'Malley, Stratford, Conn.

[73] Assignee: International Packaging Systems Inc., Norwalk, Conn.

[21] Appl. No.: 481,318

[22] Filed: Apr. 1, 1983

[51] Int. Cl.$^4$ .............................................. B29D 27/04
[52] U.S. Cl. ..................................... 264/51; 264/40.1; 264/338; 425/89; 425/142; 425/150; 425/817 R
[58] Field of Search ................. 264/51, DIG. 14, 338; 425/817 C, 4 C, 817 R, 4 R, 89, 142, 150

[56] References Cited

U.S. PATENT DOCUMENTS

| | | | |
|---|---|---|---|
| 3,813,463 | 5/1974 | Conger | 264/DIG. 14 |
| 4,150,074 | 4/1979 | Tilgner | 264/51 X |
| 4,191,722 | 3/1980 | Gould | 264/DIG. 14 |
| 4,215,730 | 8/1980 | Oswald | 264/51 X |
| 4,325,688 | 4/1982 | Kumasaka et al. | 264/51 X |
| 4,352,651 | 10/1982 | Kumasaka et al. | 264/51 X |

OTHER PUBLICATIONS

Aldfer, Sterling, "One-Shot" Polyurethane Production, in *Rubber Age*, Apr. 1963, pp. 89–93.

Primary Examiner—Philip Anderson
Attorney, Agent, or Firm—St. Onge, Steward, Johnston & Reens

[57] ABSTRACT

Open molds for forming molded packings are moved sequentially to a series of work stations. The work stations include a preparation station for preparing the molds with a separator sheet or other release agent and a clamping station for covering the molds to contain foam material within the molds during cure. The foam material is dispensed into the molds as the molds are moved from the preparation station to the clamping station. The molds may be inverted as they are moved from the clamping station to an ejection station such that removal of the molded packings is facilitated by gravity. The sequence and duration of the various operations are controlled to provide automatic manufacture of the molded packings. A unique system for delivering a thin sheet to a molding machine or to other types of sheet processing machines is also disclosed.

38 Claims, 6 Drawing Figures

Fig. 5.

APPARATUS AND METHOD FOR THE MANUFACTURE OF MOLDED PACKINGS

BACKGROUND OF THE INVENTION

The present invention relates to the manufacture of molded packings. More particularly, the invention is directed to an apparatus and method for molding packings of low-density foam or similar material for use in packaging various articles for shipment.

In the shipment of typewriters, video displays, computer terminal modules, and the like, the article must be packaged so as to protect against physical shock and vibration during handling. One technique involves the use of preformed pads or cushions that are specifically shaped to fill a portion of the space between the article and the container in which it is shipped. Typically, such pads are molded of cellular polystyrene and are placed at the ends of the article and/or above and below the article.

Such premolded pads provide only limited protection is too stiff to absorb the energy of minor shock or vibration and, since the polystyrene has almost no memory, there is little protection against a subsequent shock after the cellular structure has been crushed. Furthermore, the high temperatures and pressures required for the molding of the pads necessitate machined steel molds. Because of the high tooling costs, such pads are not used for packaging many low production items, and, generally, the pads must be centrally manufactured, stored, and transported to each packaging site.

Another packing technique involves a foam-in-place process wherein the article is placed in a container and a protective separator sheet is tucked around the article. Low-density urethane foam or similar resilient material is then poured from hand-held dispensing guns into the space between the sheet and the container to firmly support the article. The foam-in-place technique may cause undesirable stress upon sensitive portions of the article, resulting in damage, and the foam-in-place technique does not facilitate the formation of a supporting low-density foam packing below the article.

Accordingly, a related technique involves the molding of a urethane packing within the shipping container before the article is placed therein for shipment. This technique may use a mold form, generally representative of the article and any desired voids, mounted upon a platform. A separator sheet of thin plastic is placed over the mold form and drawn against the mold form by vacuum. A shipping container such as a corrugated carton with opened flaps is then placed over the mold form, and foam is injected into the container to form a molded packing directly in the container in which the article is to be shipped.

These techniques using low-density urethane foam packaging provide improved energy absorption over that of cellular polystyrene pads, and the plastic sheet provides added protection against abrasion. However, the many manual operations required and the inconvenience of molding directly in the shipping container make these techniques poorly suited to many applications. And, even when a molded packing is formed directly in the container below the article, the foam-in-place above the article may result in undesirable stress on sensitive portions of the article or inadequate support of the article. There is no convenient means to hold the separator sheet away from sensitive portions of the article and tightly against desired support surfaces during cure.

Accordingly, a need exists for a means of efficiently manufacturing molded packings, of low-density urethane foam or other resilient low-density material, that can be inserted between the article and the shipping container during packaging. Such molded packings would have the convenience of cellular polystyrene pads plus the superior energy absorption and abrasion protection of foam-in-place low-density urethane packing. In addition, the configuration of such molded packings should be controllable so as to accurately provide desired voids at sensitive portions of the article and an interference fit at desired support portions to firmly hold the article in place.

Conventional molding machines, as used in the manufacture of cellular polystyrene pads, are not suitable for molding packings of low-density urethane foam or similar material. The low-density foam lacks sufficient integrity for molding without a separator sheet of plastic or other material at the surface of the foam, and conventional molding machines cannot accommodate the sheet material. A particular problem is the difficulty of delivering a large separator sheet of thin material to a molding machine such that it can be efficiently tucked into the corners of a mold. Hand-held dispensing guns, as used in the formation of foam-in-place urethane packings described above, do not ensure a consistent, accurate flow of foam material.

It is therefore an object of the present invention to provide an apparatus and method for manufacturing molded packings of low-density urethane foam, or other resilient low-density material, for insertion between an article and a shipping container. It is a related object of the present invention to provide a means for manufacturing such molded packings accurately and efficiently without the need for expensive machined steel molds. It is a further object of the present invention to provide a means for manufacturing such molded packings that requires a minimum of human intervention and that is suited to a limited floor space. It is still a further object of the present invention to provide a sheet delivery apparatus for delivering a sheet of thin material to a molding apparatus or other sheet processing machine.

SUMMARY OF THE INVENTION

The present invention is directed to both an apparatus and method for use in the manufacture of molded packings.

According to one aspect of this invention, a plurality of open molds are movable sequentially to a series of work stations. The work stations include a preparation station for preparing the molds with a release agent, a clamping station for closing the molds to contain a foam material within the molds during cure, and an ejection station for ejecting completed molded packings from the molds. Means for dispensing the foam material into the molds is provided between the preparation station and the clamping station. A conveyor or other moving means moves the molds from the preparation station past the dispensing means to the clamping station, from the clamping station to the ejection station, and from the ejection station back to the preparation station.

Preferably, the apparatus of this invention includes means for delivering a separator sheet to the preparation station and for inserting the separator sheet into the molds to serve as the release agent. Vacuum means may be employed to hold the separator sheet in position within the molds. The clamping station may include a cover prepared with a release agent and means for selectively clamping the cover against the molds to contain the foam material during cure. The dispensing means may include individually controllable dispensing guns disposed above the path of the molds to dispense the foam material in a predetermined pattern. The moving means may comprise a continuous loop conveyor having the molds equally spaced thereon.

According to another aspect of the present invention, an apparatus for delivering a sheet of thin material from a supply roll to a molding machine or other sheet processing machine is provided. The apparatus unrolls a portion of the material from a leading edge and stores a length of the material as it is unrolled. The leading edge of the material is held by rollers or other means and is advanced toward the processing machine. Tracks adjacent the processing machine are movable to a closed position to grip the advanced material and are rollable to draw a predetermined length of the stored material. A cutting device cuts the predetermined length from the supply roll to form the sheet.

Preferably, the apparatus for delivering the sheet of thin material includes rollers for gripping the leading edge of the material to advance the leading edge toward the sheet processing machine. The apparatus may include other rollers biased to form at least one loop of the material to store the unrolled material and may include sensing means to control the length of material unrolled from the supply roll and stored in preparation for delivering the sheet. This apparatus is particularly useful in delivering large, easily tearable sheets, such as those required as separator sheets in molding low-density urethane or similar material.

According to another aspect of the present invention, a series of steps comprising a method for manufacturing molded packings is provided. Open molds are moved sequentially to a series of work stations in a continuous loop. The molds are prepared with a separator sheet or other release agent at a first work station, and a foam material is dispensed into the molds while the molds are moving from the first work station to a second work station. The molds are closed at the second work station to contain the foam material during cure and are inverted as they are moved to a third work station. At the third work station, the completed molded packings are ejected from the molds by pushing on the molded packings from within the molds.

It is a particular feature of the present invention that the molds can be made inexpensively and can be easily installed and removed from the apparatus to facilitate the manufacture of molded packings having various configurations. And, a resilient plug may be used to insert the separator sheet into the molds to permit two or more molds to be installed simultaneously, thereby allowing top and bottom molded packings, for example, to be manufactured alternately. The apparatus requires little floor space and can be conveniently placed adjacent an assembly line of an article to be packaged such that the molded packings need not be stored and transported from a centralized molding machine.

The invention, together with further objects and attendant advantages, will be best understood by reference to the following detailed description of the preferred embodiment taken in conjunction with the accompanying drawings.

DESCRIPTION OF THE PREFERRED EMBODIMENT

Figure 1:
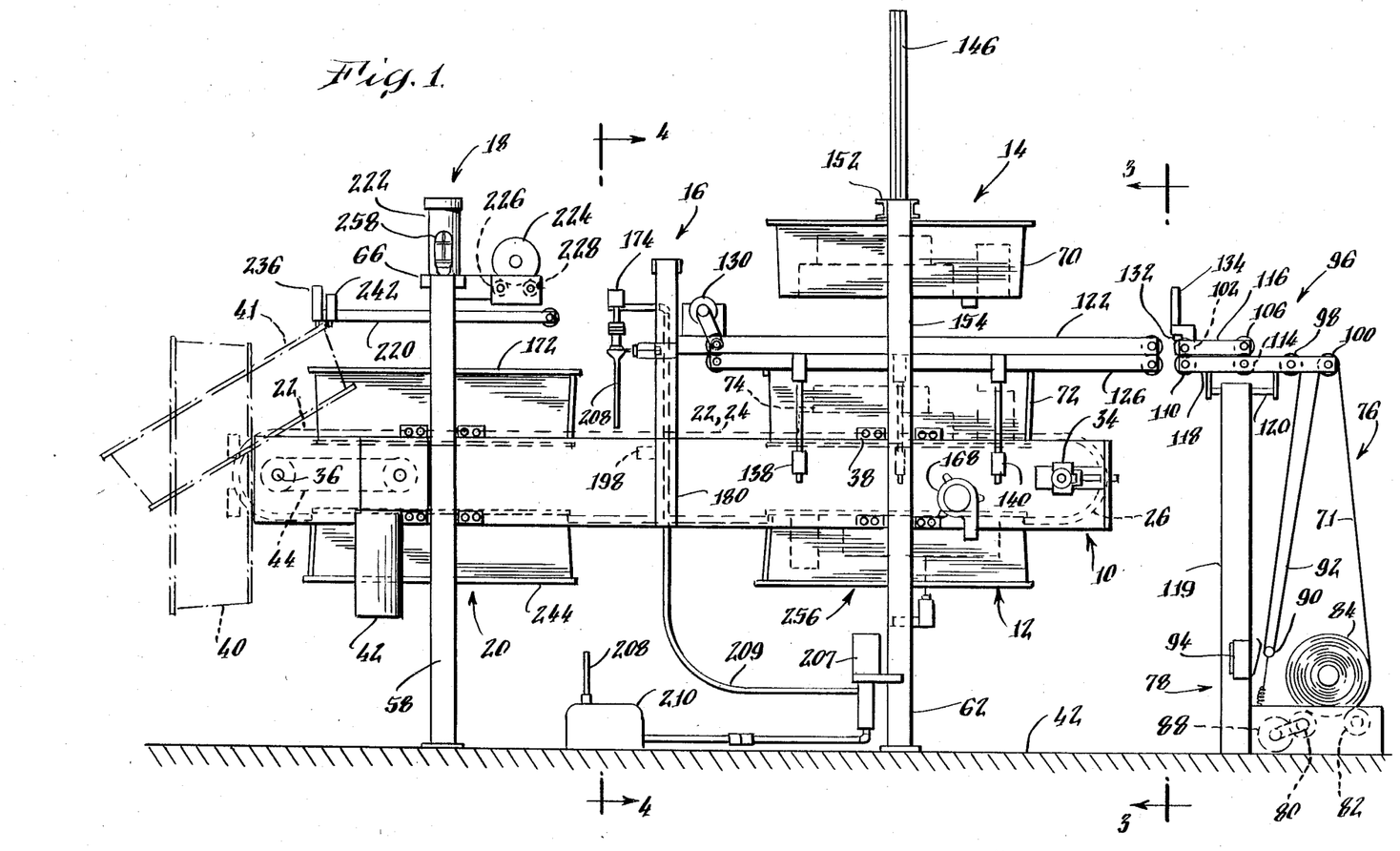
FIG. 1 is a side elevation of the preferred embodiment of the present invention with intermediate positions of a mold box shown in phantom.
Figure 2:
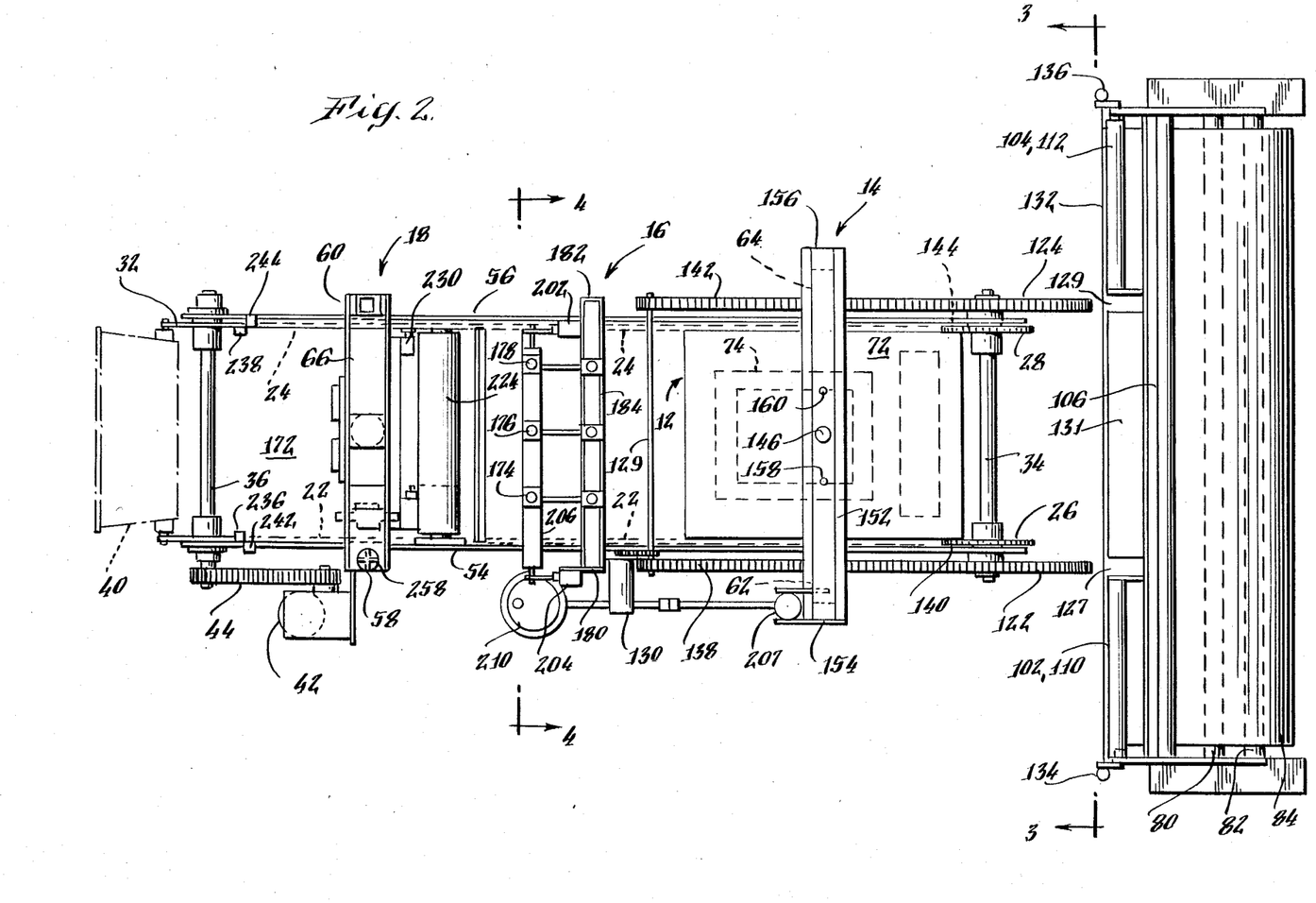
FIG. 2 is a plan view of the preferred embodiment of the present invention corresponding to FIG. 1.

Turning now to the drawings, FIGS. 1 and 2 show in side elevation and plan view an apparatus for making molded packings in accordance with this invention. As shown in FIG. 1, the apparatus includes suitable means such as a continuous conveyor, indicated generally by the numeral 10, for moving a plurality of open mold boxes, indicated generally by the numeral 12, between a series of work stations. The mold boxes 12 are advanced sequentially by the conveyor 10 from a preparation station 14, past a dispensing station 16, to a clamping station 18, to an ejection station 20, and back to the preparation station 14.

Although alternative conveyor configurations may be used with similar effect, the conveyor 10 may include continuous belts or chains 22, 24 engaged by sprockets 26, 28, 30, 32. The sprockets are joined by axles 34, 36 to ensure movement in unison. Each of the mold boxes 12 is releasably mounted upon the chains 22, 24 by four pivotal mountings 38. The mountings 38 are centered sufficiently to permit the mold boxes to follow the circumference of the sprockets as indicated by the mold boxes 40, 41 shown in phantom in FIGS. 1 and 2. A drive motor 42 or other suitable drive means is selectively engageable to drive the chains 22, 24 in a counter-clockwise loop, as shown in FIG. 1. Transmission means such as, for example, a belt or chain drive 44 may be used to transmit power to the sprocket 30, as shown.

Figure 3:
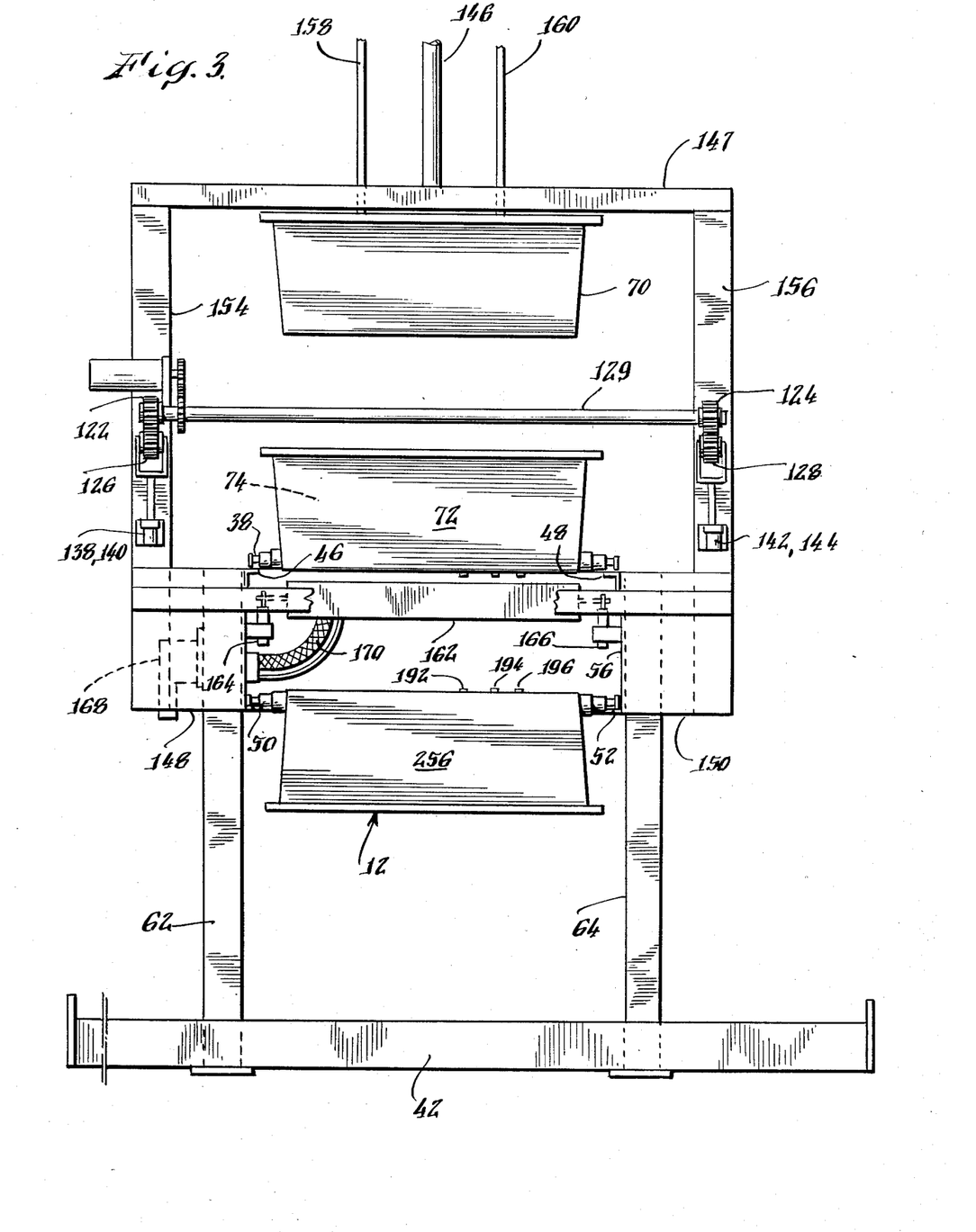
FIG. 3 is an enlarged sectional view of portions of the preferred embodiment taken along the line 3—3 of FIG. 1 and showing the preparation station.
Figure 4:
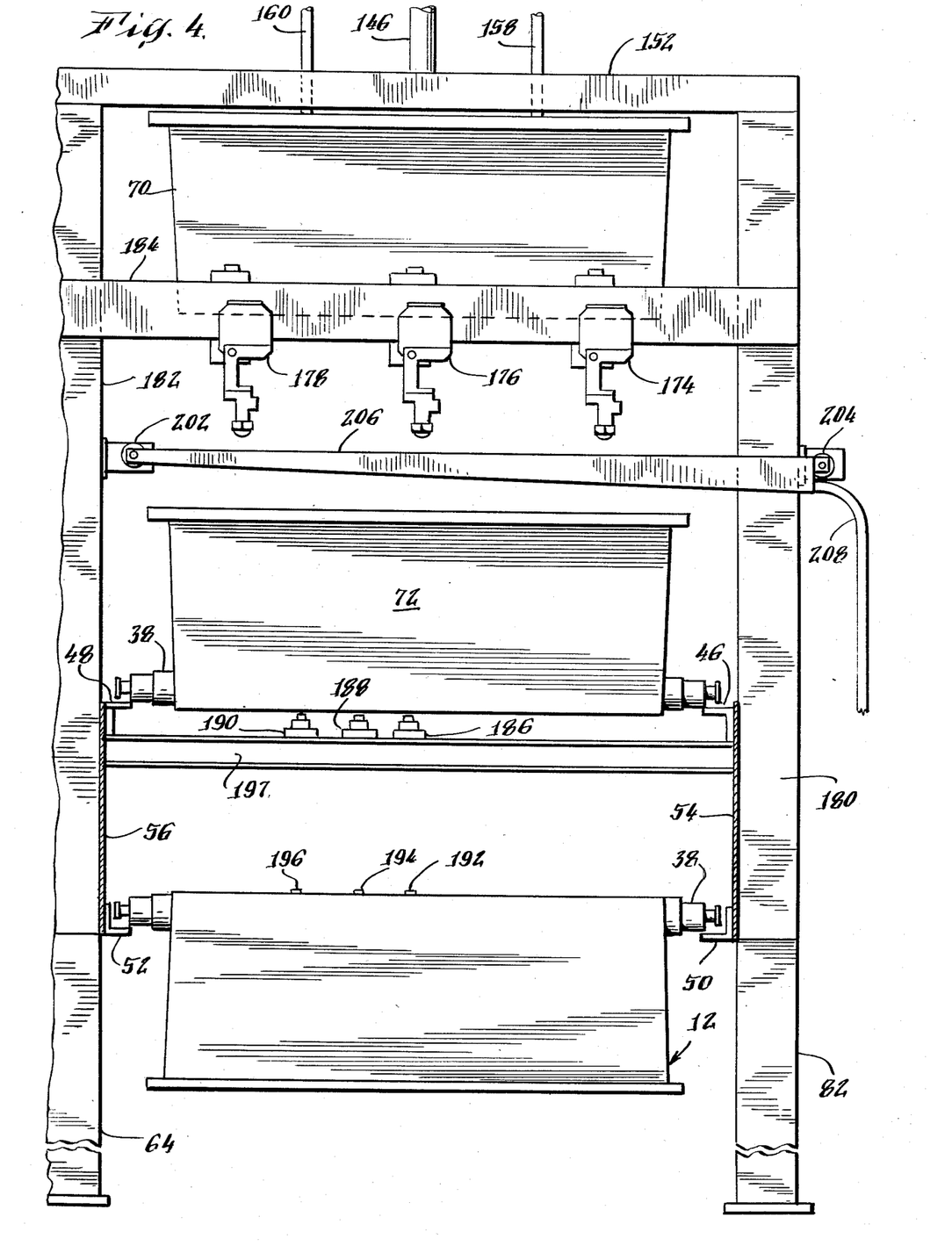
FIG. 4 is an enlarged sectional view of the preferred embodiment taken along the line 4—4 of FIG. 1 and showing the dispensing station.
Figure 5:
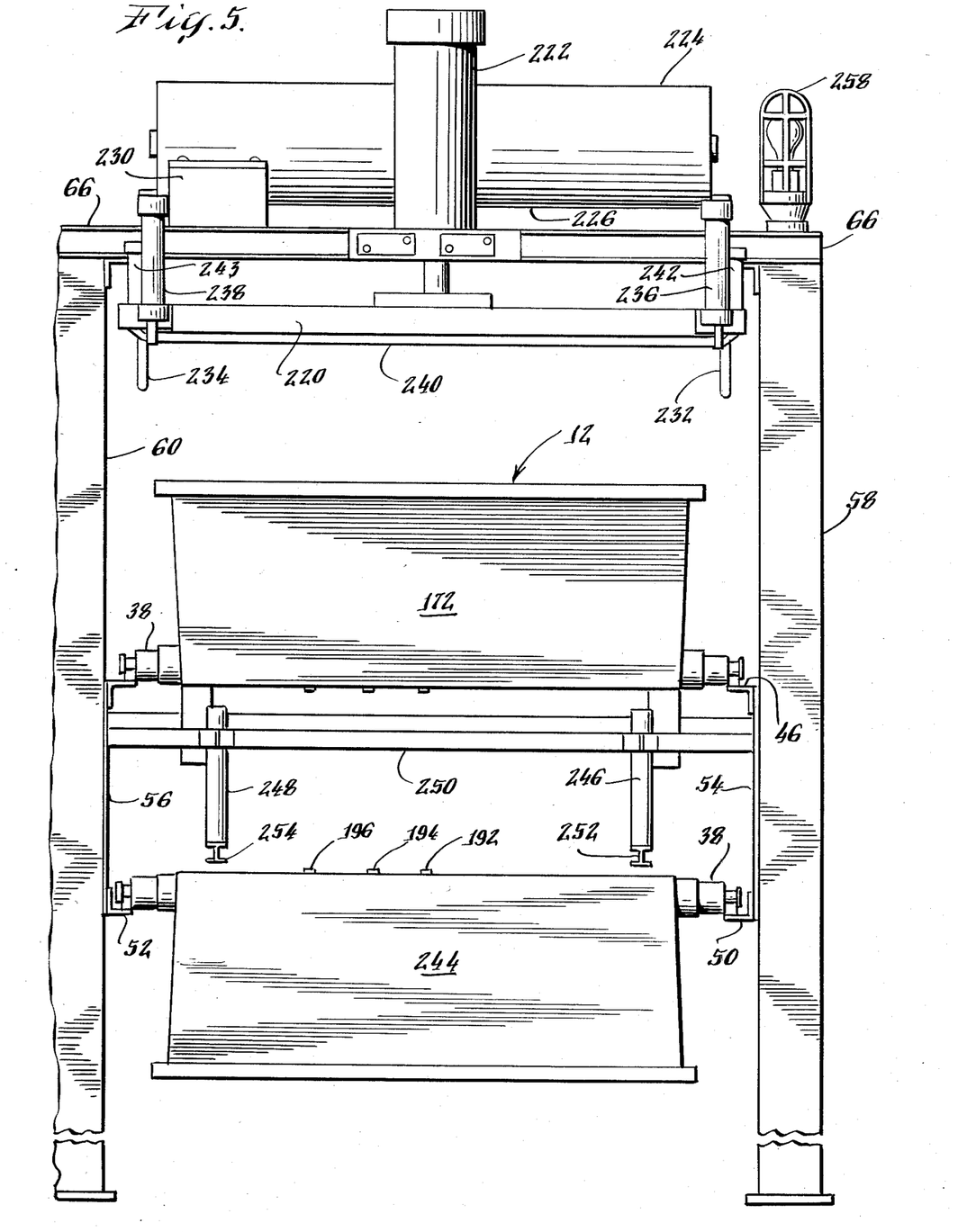
FIG. 5 is an enlarged left end elevation of the preferred embodiment showing the clamping station and the ejection station.

As best shown in FIGS. 3-5, upper tracks 46, 48 and lower tracks 50, 52 are, preferably, placed below the chains 22, 24 to maintain alignment of the chains 22, 24, and support the weight of the mold boxes 12. The upper and lower tracks can be fixed to side panels 54, 56 upon which the axles 34, 36 are journaled. The side panels 54, 56 are supported by vertical members 58, 60, 62, 64 which are flange-mounted to the floor 42. Vertical members 58, 60 are joined by a horizontal member 66, as shown. A sensor, not shown, initiates an emergency shutdown if the conveyor 10 becomes jammed.

Preferably, the preparation station 14, best shown in FIG. 3, employs a movable plug 70 to push a separator sheet 71 of polyethylene film into position within a first mold box 72. The configuration of the plug 70 is generally the negative of that of an internal surface or mold cavity 74 of the mold box 72 to ensure that the separator sheet 71 is tucked firmly into the corners of the mold cavity. The plug 70 may be made of any suitable material and may be conveniently molded of foam. It should be understood that alternative release agents may be used in place of the separator sheet 71 shown.

A particular feature of the preferred embodiment is that more than one configuration of molded packing can be produced on a single apparatus. Applicant has found that by making the plug 70 of a resilient high density foam such as, for example, urethane foam having a density of 2.0 pounds per cubic foot, the plug 70 can conform to a variety of shapes. The mold boxes 12 may then have different configurations of the cavity 74 corresponding for example, to the upper and lower contours of the article to be packed such that upper and lower molded packings can be produced alternately. Mold boxes with four different configurations of the cavity 74 may be used simultaneously.

A unique poly-feed system, indicated generally by the numeral 76, may be used to automatically deliver the separator sheet 71 to the preparation station 14; however, other delivery systems could be employed. The poly-feed system 76 includes a lower end assembly, indicated generally by the numeral 78, having two long rollers 80 and 82 positioned horizontally to form a bed for supporting a large roll 84 of the separator sheet 71 having a leading edge. A drive motor 88 rotates the roller 80 to unroll the leading edge of the separator sheet 71 when electrically actuated by the upward movement of a spring-mounted dancer 90 that holds a loop 92 of the separator sheet 71.

The dancer 90 moves upward and actuates a microswitch 94 when the poly-feed system 76 delivers the loop 92 to the preparation station 14, as described below. After feeding of the loop 92, the drive motor 88 unrolls the roll 84 until the dancer 90 pulls down another loop of the separator sheet 71 in preparation for another delivery cycle. Preferably, a sensor, not shown, indicates when the amount of separator sheet 71 on the roll 84 is low. A movable upper assembly, indicated generally by the numeral 96, includes free-wheeling rollers 98 and 100 that cooperate with the dancer 90 to form the loop 92.

As best shown in FIGS. 1 and 2, multiple upper rollers 102, 104, 106 engage lower rollers 110, 112, 114 to hold the separator sheet 71 firmly in position therebetween. Preferably, the rollers are linked together to ensure movement in unison and to facilitate loading of the separator sheet 71. The upper and lower rollers are journaled upon upper and lower frame members 116 and 118, respectively, of the upper assembly 96. The rollers may include a resilient or high-friction surface to provide improved gripping of the separator sheet 71.

One or more fluid cylinders 120 effect horizontal movement of the upper assembly 96 as a unit toward the preparation station 14. This horizontal movement of the upper assembly 96 places the separator sheet 71 between moving upper tracks or grip belts 122, 124 and lower tracks or grips belts 126, 128 of the preparation station 14. Openings 127 and 129, provided between the upper rollers 102 and 104 and a central table portion 131, permit this horizontal movement. The rollers allow the separator sheet 71 to be pulled forward toward the preparation station 14 and may be provided with a ratchet device to ensure that the separator sheet 71 is not pulled backward out of the rollers.

The upper grip belts 122, 124, joined by axle 129, are driven clockwise by a motor 130, as shown in FIG. 1, which is timed to dispense the correct length of the separator sheet 71. Once this timer times out, the drive motor 130 stops, and a hot wire 132, mounted upon the frame member 116 of the upper assembly 96, is extended by a pair of fluid cylinders 134, 136 so as to be forced through the separator sheet 71 to cut the sheet to length. The upper assembly 96 is returned to the position shown in FIGS. 1 and 2 by the fluid cylinders 120 during delivery of the separator sheet 71 to permit the hot wire 132 to clear the upper and lower grip belts 122, 124, 126, 128.

The lower grip belts 126, 128 are moveably mounted and are actuated by fluid cylinders 138, 140, 142, 144 between a raised position in engagement with the upper grip belts and a lowered position. The lowered position facilitates horizontal movement of the upper assembly 96 toward the preparation station 14 and releases the separator sheet 71. The lower grip belts act as followers; only the upper grip belts are driven by the motor 130. Preferably, a resistance sensor, not shown, senses continuity of the hot wire 132 to indicate that the hot wire 132 is not broken.

With the separator sheet 71 cut to length and positioned by the grip belts, the plug 70 is forced downward into the cavity 74 of the mold box 72. Simultaneously, the lower feed tracks 126, 128 are lowered by the fluid cylinders 138, 140, 142, 144 to free the separator sheet from the grip belts. As best shown in FIG. 3, movement of the plug 70 is provided by a fluid drive means 146 mounted on a horizontal member 147 supported from the vertical members 62, 64, horizontal members 148, 150, and secondary vertical members 154, 156. Guide rods 158, 160 ensure alignment of the plug 70 with the mold box 72.

In the preferred embodiment, a vacuum tray 162 is raised by fluid cylinders 164, 166 to abut the underside of the mold box 72 when the plug 70 bottoms out in the cavity 74. Alternatively, other suitable means for holding the separator sheet 71 could be employed. The vacuum tray 162 has a perimeter corresponding to that of the mold box 72 and a gasket for sealing the vacuum tray to the mold box. Applicant has found that a vacuum tray depth of 2 inches is sufficient for a typical application such as that described below.

A vacuum motor 168, connected to the vacuum tray 162 by a flexible tube 170, is energized to create a vacuum in the vacuum tray 162. The bottom of the mold box 72 and the cavity 74 are perforated with many small holes to provide air communication between the vacuum tray 162 and the surface of the separator sheet 71. When the separator sheet 71 is held in place by the vacuum, the plug 70 is retracted by the fluid power means 146, leaving the mold cavity 74 prepared for filling with foam material. A vacuum sensor, not shown, tests for a predetermined amount of vacuum in the tray to ensure that the separator sheet 71 is in position as a parting agent prior to cycling of the conveyor 10.

When these preparation steps and the partial curing of the foam material, described below are completed, the conveyor 10 is actuated to move the first mold box 72 in a continuous motion from the preparation station 14 to a position at the clamping station 18, indicated by that of the second mold box 172 in FIGS. 1 and 2. As the mold box passes under the dispensing station 16, a predetermined amount of polyurethane or other suitable foam material is dispensed into the mold cavity 74 by suitable dispensing means such as dispensing guns 174, 176, 178, best shown in FIG. 4. The dispensing guns may be conveniently fixed to the side panels 54, 56 of the conveyor 10 by vertical support members 180, 182 and a horizontal member 184 therebetween.

It is a particular feature of the preferred embodiment that gravity is employed to facilitate the flow of the foam material as well as the removal of the completed molded packings, as discussed below. The dispensing guns may have multiple jets per head to further provide precise flow of the foam material into portions of the cavity 74. Although provision may be made to continue the application of vacuum to the separator sheet 71 until the dispensing of the foam material has been completed, Applicant has found that such provision is unnecessary. For convenience, the vacuum tray is withdrawn by the fluid cylinders 164, 166 before the mold box is moved from the preparation station 14 to the dispensing station 16.

Preferably, the dispensing guns 174, 176, 178 are actuated by microswitches 186, 188, 190, which may be conveniently mounted upon a cross-member 197, selectively actuated by trip plates 192, 194, 196, respectively, as the mold boxes pass. Although three dispensing guns are illustrated, it will be apparent that any number of dispensing guns may be controlled by a like number of microswitches to provide a predetermined flow of chemical foam material into the contours of the mold cavity 74. The dispensing period for each gun may be controlled independently by appropriate location of the trip plates. The same microswitches may be actuated by trip plates of other interchangeable mold boxes to automatically provide a different preprogrammed flow pattern for forming molded packings of a different configuration on the same apparatus.

The apparatus of the preferred embodiment includes a purge operation to clean the dispensing guns 174, 176, 178 following each use. After the mold box 72 passes the dispensing station 16, fluid cylinders 202, 204 move a solvent trough 206 into position below the jets of the pour guns 174, 176, 178 to permit flushing of the gun heads. A pump 207 circulates recycled and filtered solvent to the dispensing guns 174, 176, 178 by a delivery tube 209. A tube 208 carries the solvent from the trough 206 to a holding tank 210 for recycling. Preferably, a pressure sensor, not shown, is used to give a warning when the solvent level is low. After purging, the solvent trough 206 is retracted by the fluid cyclinders 202, 204 in preparation for the next dispensing cycle. Each dispensing gun can be flowed individually for testing or purging and can be solvent flushed manually.

The mold box 72 is moved continuously by the conveyor 10 from the preparation station 14 to the clamping station 18 before coming to rest. The clamping station 18 includes a cover 220 which is moved downward by a fluid cylinder 222 into engagement with the top of the mold box 172 to constrain the foam material as it expands and cures. Alternatively, other suitable means for closing the cavity 74 could be employed. The fluid cylinder 222 may be conveniently mounted upon the horizontal member 66. The cover 220 may be flat, as shown, or may have a raised configuration to provide packing locations for supplementary articles or to reduce the amount of foam material required.

Although other methods such as a teflon spray could be used to prevent bonding of the cover 220 to the foam, the preferred embodiment provides a separate sheet of a suitable material such as polyethylene film between the cover 220 and the mold box 172. A small roll 224 of the separator sheet is supported upon a bed of rollers 226, 228 which are driven by a drive motor 230 through a pully and belt or similar transmission means. During the operation cycle, the separator sheet adheres to the foam material within the cavity 74 as the cover 220 is raised by the fluid cylinder 222. Later, when the conveyor 10 moves the mold box 172 foward, the drive motor 230 feeds the separator sheet from the roll 224 to maintain a slack condition of the separator sheet.

As the mold box is tipped on edge at the end of the conveyor 10, as shown as mold box 41 in phantom in FIG. 1, the back edge of the mold box 41 is levered upward, bringing the separator sheet adjacent the raised cover 220. A pair of toggle clamps 232, 234, actuated by fluid cylinders 236, 238, are mounted on the cover 220 adjacent the path of the separator sheet. At the instant the back edge of the mold box passes the clamps 232, 234, the fluid cylinders 236, 238 are energized to pivot the fingers of the clamps 232, 234 under the separator sheet and hold the separator sheet firmly against the underside of the cover 220.

Approximately 0.1 second after the separator sheet is clamped to the underside of the cover 220, a hot wire 240, movably mounted on the edge of the cover 220, is moved downward by a pair of fluid cylinders 242, 243 to cut the separator sheet. The drive motor 230 is then stopped, leaving the separator sheet below the cover 220 in position for closing another mold cavity 74. After the next mold box moves into position below the cover 220 and the cover 220 is lowered by the fluid cylinder 222, the fingers of the clamps 232, 234 are opened. This permits the cover 220 to be raised while leaving the separator sheet adhering to the foam material after the foam material has become sufficiently cured. A sensor, not shown, indicates when the amount of separator sheet remaining on the roll 224 is low.

During the next moving cycle, the mold box 172 moves from the clamping station 18 through the inclined position indicated in phantom as mold boxes 40, 41 to an inverted position at the ejection station 20, indicated as that of mold box 244. As best shown in FIG. 5, two fluid cylinders 246, 248, conveniently fixed to a cross-bar 250 joining the vertical members 58, 60, are energized to extend ejector members or bars 252, 254 through slots penetrating the mold box 244 and the cavity 74 to push the completed molded packing downward from the mold box 244. Due to the inverted position of the mold box 244, the completed molded packing falls cleanly from the cavity 74 by the force of gravity without the need for lifting means.

Compressed air or other fluid may be expelled from the ends of the bars 252, 254 to aid in removing the completed molded packing. The apparatus may include means for automatically weighing the completed pad as a quality check to ensure uniform foam material. It should be apparent that if part of the foam material were to adhere to the cavity 74, as might occur if the separator sheet 71 ruptured, subsequently formed molded packings might have incomplete portions even though their weight might indicate a full load of foam material from the dispensing gun. The vacuum sensor described above ensures an advance warning of a ruptured separator sheet 71.

As the mold box 244 continues from the ejection station 20 back to the preparation station 14, it is stationary at a rest station, indicated generally by the numeral 256, for an additional cycle. This station is necessitated by the geometry of the conveyor 10, there being no need for an additional work station. The geometry shown is particularly advantageous because it permits two mold boxes for forming upper molded packings and two mold boxes for forming lower molded packings to be installed on the apparatus simultaneously. The rest station 256 of the preferred embodiment may include sensing means such as a microswitch with pivoted arm, not shown, to indicate that a molded packing has been properly ejected and to prevent further cycling of the apparatus if a molded packing is present.

The operation of the preferred embodiment may be summarized as follows. A separator sheet is fed from a supply roll into a pair of tracks which move the separator sheet over the top of a mold cavity. The separator sheet is then cut free from its supply roll by a hot wire. A plug pushes the separator sheet into the mold cavity and vacuum holds the separator sheet in place as the plug is removed. The mold cavity is then moved under a battery of dispensing guns which charge the mold cavity with foam material. When the mold cavity comes to rest, a fluid cylinder presses a cover prepared with a separator sheet or other parting agent over the mold cavity to contain the foam material during the curing process. After the foam material has sufficiently cured, the mold cavity is inverted and is moved to an ejection station where fluid cylinders, with or without the assistance of compressed air, push the completed molded packing out of the mold cavity. The empoty mold cavity is then moved in an upside-down position to the preparation station where it is turned upright to receive another separator sheet and repeat the sequence.

Figure 6:
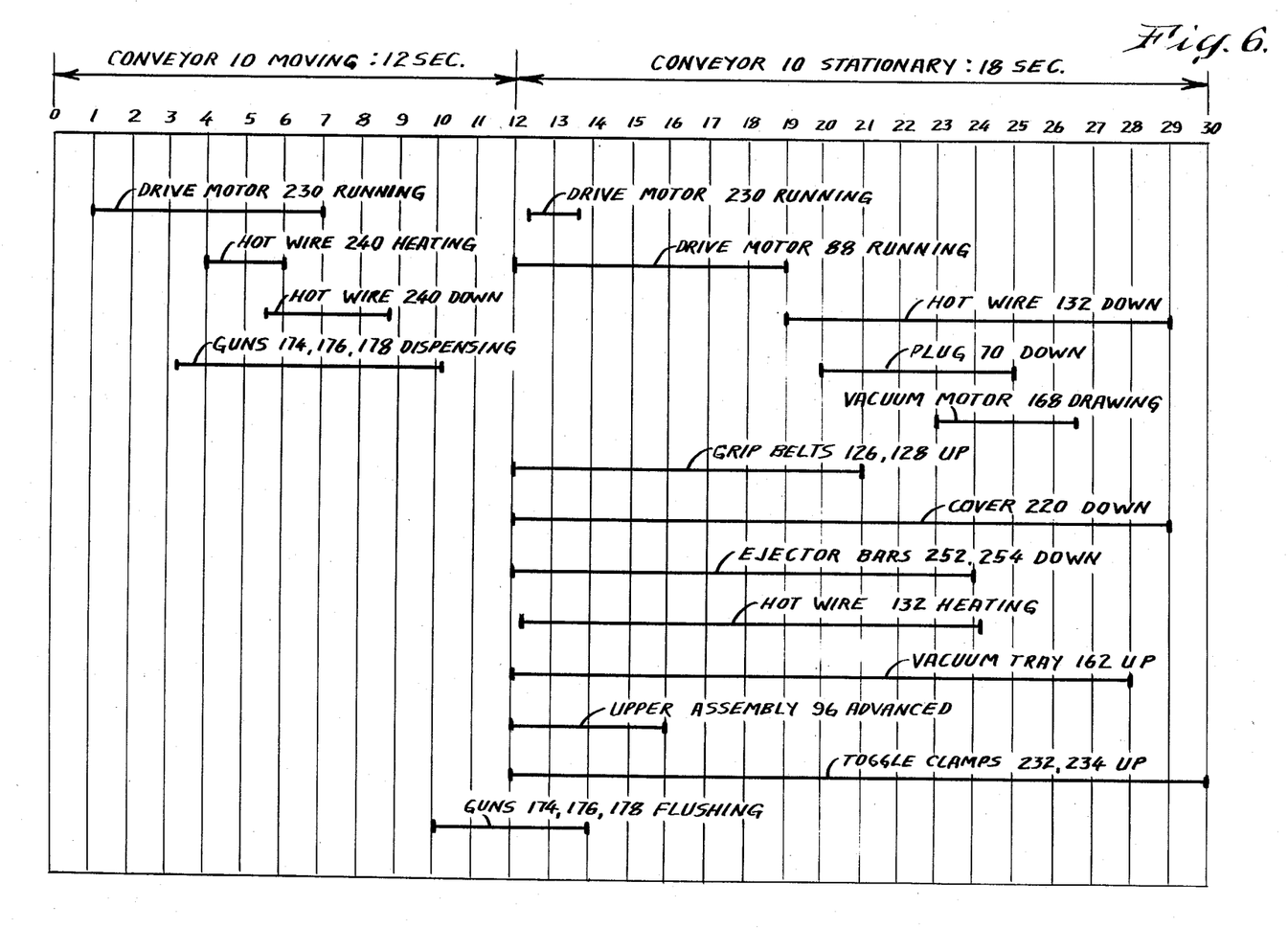
FIG. 6 is a time diagram showing the sequence and duration of operations employed by the preferred embodiment.

These operation steps are carried out automatically with the aid of a timing device that coordinates the steps in sequence and duration, as indicated in FIG. 6. The indicated timing and sequence may be controlled by any of various commercially available microprocessors or other suitable timing devices to avoid the need for human intervention. However, it is preferred that the individual cycle at each station can be carried out independently for testing or for restarting following an emergency shutdown. Preferably, restart may be initiated only at the start of the cycle and on ready signals from all stations.

The support structure of the apparatus may be formed of conventional materials such as steel and aluminum sections bolted or welded together into the configuration shown. The mold boxes 12 may be conveniently formed of steel and/or aluminum. Due to the low temperatures and pressures required relative to those required for molding cellular polystyrene, the mold cavity 74 can be formed inexpensively; for low production runs, such convenient materials as plywood may be used. One or more warning lights 258 may be installed to indicate operation of the apparatus or sensing of a condition which requires attention.

Applicant has determined that a suitable film for the rolls 84 and 224 is 0.7 mil high-density polyethylene as supplied by Port Poly of Salem, N.H. or 1.5 mil low-density polyethylene as supplied by Armin Polyethylene Film of Elizabeth, N.J. Suitable polyurethane foam material for use with the present invention is freon or water blown semi-rigid or flexible urethane foam having a density of 0.4 to 0.7 pounds per cubic foot. Such foam material is commercially available, for example, as TR-240, FR-245, TR-250, or TR-257 supplied by International Packaging Systems of Norwalk, Conn. Other foam materials having densities of 0.25 to 4.0 pounds per cubic foot may also be used.

Applicant has found that the present invention is particularly well suited to the formation of molded packings for cushioning computer terminals during shipment. The molded packings are placed above and below the terminal inside a corrugated carbon to absorb physical shock and vibration during shipment. The apparatus and method described herein have been successfully used to form individual molded packings having dimensions approximately 23 in. $\times$ 35 in. $\times$ 10 in. and weighing approximately 2.0 lbs. A top molded packing and a bottom molded packing, each requiring a different constraining impression, are formed for each computer terminal.

In this application just described, it has been found that the apparatus is capable of producing 1500–1600 molded packings (750–800 top and bottom pairs) within a 16-hour period by employing a stationary time of 18 seconds at each work station and a moving time of 12 seconds between work stations. The total system for this application requires less than 250 square feet of floor space. The apparatus can be positioned adjacent the assembly line of the computer terminals for convenient manufacture of the molded packings as they are needed. In this way, there is no need to store or transport bulky packings from a central manufacturing facility.

From the foregoing, it should be apparent that the present invention can efficiently produce large quantities of molded packings of low-density resilient material for insertion between an article and a shipping container. The apparatus and method described herein permit fully automatic operation and ensure a consistent high quality of output. The molds for the molded packings may be replaced and/or changed easily to change the type of molded packing produced or to permit more than one type of molded packing to be produced alternately on a single apparatus. The apparatus is easily serviced and includes numerous safeguards to ensure that its operation is safe and in a predetermined, timed sequence. As a result of the inversion of the mold boxes at various stations, gravity assists the removal of completed pads and required floor space is reduced.

Of course, it should be understood that various changes and modifications to the preferred embodiment described above will be apparent to those skilled in the art. For example, other means may be employed to deliver the separator sheet to the preparation station, and other types of conveyors or conveyors with additional work stations may be used. Similarly, other foam materials and parting agents may be used to achieve like results. Such changes and modifications can be made without departing from the spirit and scope of the present invention, and it is therefore intended that such changes and modifications be covered by the following claims:

What is claimed is:

1. A method for manufacturing molded packings comprising:
   providing a plurality of open molds;
   moving the molds sequentially to a series of work stations in a continuous loop;
   delivering a predetermined length of film from a supply roll to the first work station, holding the length of film over the molds at the first work station, cutting the film to the predetermined length to form a sheet, pushing the sheet into the molds, and holding the sheet in position within the molds by applying vacuum to the bottom of the molds;

dispensing a predetermined pattern of foam material into the molds while the molds are moving from the first station to a second work station;

closing the molds to contain the foam material during cure at the second work station; and ejecting the completed molded packings from the molds by pressure on the molded packings from within the molds.

2. The method of claim 1 wherein the closing of the molds to contain the foam during cure at the second work station further comprises delivering a film between a cover and the molds to serve as a release agent before closing of the mold and clamping the cover over the molds.

3. The method of claim 1 wherein the dispensing of the foam material further comprises providing a plurality of dispensing guns adjacent the path of the molds, providing trip means on the molds for actuating a switch means, and selectively dispensing foam material from the dispensing guns by actuating the switch means to initiate and terminate flow from the dispensing guns as the molds pass the dispensing guns.

4. The method of claim 1 further comprising inverting the molds as the forms are moved from the second work station to a third work station.

5. An apparatus for manufacturing molded packings comprising:

a plurality of open molds;

a preparation station having means for delivering a separator sheet for protecting the molds; said delivering means including;

a supply of a thin sheet material;

means for feeding the sheet material from the roll means for releasably holding the sheet material;

means for releasably gripping the sheet material;

means for causing relative movement between the releasably holding means and said gripping means so as to bring the sheet into operative engagement with the gripping means;

means for moving said gripping means to deliver a length of said sheet material to the preparation station; and means for severing said sheet material from said delivered length;

a clamping station having means for closing the molds to contain a foam material within the molds during cure of the foam material;

means for dispensing the foam material into the molds, the dispensing means being located between the preparation station and the clamping station;

an ejection station having means for ejecting completed molded packages from the molds;

means for moving the molds sequentially from the preparation station past the dispensing means to the clamping station, from the clamping station to the ejection station, and from the ejection station back to the preparation station; and means for controlling the means for preparing the molds, the means for dispensing the foam material, the means for covering the molds, the means for ejecting completed molded packings, and the means for moving the molds to ensure a predetermined sequence of operation.

6. The apparatus of claim 5 and further comprising means for inserting the separator sheet into the molds to serve as the release agent.

7. The apparatus of claim 6 further comprising vacuum means for holding the separator sheet in position within the molds following insertion.

8. The apparatus of claim 6 wherein the inserting means comprises a movable resilient plug having a configuration generally the negative of that of the molds for pushing the separator sheet into the molds.

9. The apparatus of claim 8 wherein the molds have different configurations such that a plurality of configurations of molded packings may be manufactured on the apparatus.

10. The apparatus of claim 9 wherein the molds comprise two molds having a configuration corresponding to the bottom of an article to be packed for shipment and two molds having a configuration corresponding to the top of the article, the molds being arranged so as to produce top and bottom molded packings alternately.

11. The apparatus of claim 1 wherein the closing means comprises a cover, means for preparing the cover with a release agent, and means for clamping the cover against the molds to close the molds to contain the foam material during cure.

12. The apparatus of claim 11 wherein the means for preparing the cover with a release agent comprises means for delivering a separator sheet to a position between the cover and the molds, the separator sheet comprising the release agent.

13. The apparatus of claim 12 wherein the delivering means comprises a supply roll of film from which the separator sheet is unrolled along a path by the movement of the molds, means for holding the separator sheet, and means for cutting the separator sheet from the supply roll.

14. The apparatus of claim 13 wherein the holding means comprises clamps movably mounted on the cover adjacent the path of the film as the molds are moved from the clamping staion to the ejection station, the clamps being operable to hold the film against the cover.

15. The apparatus of claim 14 wherein the cutting means comprises a hot element movable against the film when the film is held against the cover by the clamps to cut the separator sheet from the supply roll.

16. The apparatus of claim 1 wherein the dispensing means comprises a plurality of dispensing guns positioned adjacent path of the molds between the preparation station and the clamping station, the dispensing guns being individually controllable to dispense a predetermined pattern of foam material into the molds.

17. The apparatus of claim 16 wherein the means for individually controlling the dispensing guns comprises means mounted on the molds associated with each dispensing gun for initiating and discontinuing dispensing of foam material from the respective dispensing guns as the molds pass the dispensing guns.

18. The apparatus of claim 17 wherein the initating and discontinuing means comprises a trip means for actuating a stationary switch means, the switch means being operably connected to the respective dispensing guns.

19. The apparatus of claim 1 wherein the ejecting means further comprises means for penetrating the molds to push the completed molded packings to ensure removal of the molded packings from the molds.

20. The apparatus of claim 19 wherein the penetrating means comprises an ejector member movable through the molds, the member having means for expelling fluid therefrom to assist removal of the molded packings.

21. The apparatus of claim 1 wherein the moving means comprises a continuous loop conveyor having the molds equally spaced thereon and wherein the preparation station, the clamping station, and the ejection station are spaced such that one of said molds occupies each of said stations simultaneously.

22. The apparatus of claim 1 wherein the moving means is operative to move the molds intermittently such that the molds move past the dispensing means at a predetermined rate to distribute the foam material in a predetermined manner within the molds and such that the molds come to rest at the clamping station before the foam material fills the molds and such that the molds remain at rest for a predetermined time to permit the foam material to expand and partially cure while the closing means contains the foam material within the molds.

23. The apparatus of claim 1 wherein the molds are in an inverted position at the ejection station relative to the position of the molds at the clamping station such that removal of the molded packings is facilitated by gravity.

24. An apparatus for manufacturing molded packings comprising:
   a plurality of mold boxes each having an open top, an internal surface defining a surface of the desired molded packings, and a perforate bottom;
   supply means for a thin sheet material;
   means for feeding the sheet material from said supply;
   means for releasably gripping the sheet material as it is received from said feeding means;
   means for moving said gripping means to deliver a length of said sheet material to a preparation station; and
   means for severing said sheet material from said delivered length;
   a preparation station having means for inserting the separator sheet into the mold boxes to serve as a release agent, the preparation station having a plug means for pushing the separator sheet into the mold boxes and means for applying vacuum to the perforate bottom of the mold boxes for holding the separator sheet against the internal surface of the mold boxes;
   a clamping station having means for clamping a cover over the mold boxes to contain a foam material between the internal surface and the cover during cure, the clamping station having means for delivering a separator sheet between the cover and the mold boxes;
   a plurality of dispensing guns positioned between the preparation station and the clamping station for dispensing the foam material into the mold boxes;
   an ejection station having means for ejecting completed molded packings from the mold boxes, the ejecting means being adapted to push the molded packings from the mold boxes;
   a conveyor for moving the mold boxes sequentially from the preparation station past the dispensing guns to the clamping station, from the clamping station to the ejection station, and from the ejection station back to the preparation station, and for inverting the mold boxes from an upright position at the clamping station to an inverted position at the ejection station such that removal of the pads is facilitated by gravity, the conveyor being operative to move the mold boxes intermittently such that the mold boxes move past the dispensing guns at a predetermined rate to facilitate distribution of the foam material within the mold boxes and such that the mold boxes come to rest at the clamping station before the form material fills the mold boxes and such that the mold boxes remain at rest for a predetermined time to permit the foam material to expand and partially cure while the closing means contains the foam material within the mold boxes;
   means for controlling the dispensing guns to ensure a predetermined timing and duration of the dispensing of the foam material in a desired pattern on the internal surface of the mold boxes; and
   means for controlling the inserting means, the plug means, the vacuum means, the clamping means, and the ejecting means in relation to the movement of the mold boxes by the conveyor to ensure a predetermined duration and sequence of operation.

25. The apparatus of claim 24 wherein the delivering means comprises a supply roll of film from which the separator sheet is unrolled by the movement of the mold boxes, means for holding the separator sheet against the cover, and means for cutting the separator sheet from the supply roll.

26. The apparatus of claim 24 wherein the controlling means comprises a microprocessor for initiating and terminating operations of the inserting means, the plug means, the vacuum means, the clamping means and the ejecting means in a predetermined sequence such that no operations are initiated until predetermined prerequisite operations are completed.

27. The apparatus of claim 24 wherein the conveyor comprises a continuous loop chain in a vertical plane, the mold boxes being pivotally mounted thereon, the preparation station and clamping station being on the upper portion of the conveyor loop and the ejection station being on the lower portion of the conveyor loop, the mold boxes being inverted as they move around the loop of the conveyor.

28. An apparatus for delivering and transferring a sheet of thin material having a leading edge from a supply roll to a sheet processing machine comprising:
   means for unrolling a portion of the material from the roll;
   means for storing a length of the material unrolled by the unrolling means;
   means for releasably holding the material in the vicinity of the leading edge and for advancing the leading edge;
   a plurality of sheet gripping and moving tracks separable between open and closed positions, the tracks being aligned to grip the advanced sheet, the tracks being sized to draw a predetermined length of the sheet material from the storing means;
   means for cutting the predetermined length of sheet material gripped by the tracks off from the supply roll; and
   means for moving said tracks between open and closed positions.

29. The apparatus of claim 28 wherein the holding and advancing means comprises separable rollers for holding the sheet material,
   means for moving the rollers toward the tracks to position the leading edge of the sheet material between the tracks while the latter are in said open position and move away from the tracks after the leading edge is gripped by the tracks.

30. The apparatus of claim 28 wherein the storing means comprises at least three elements a middle one of which is a dancer so as to form a storage loop of the sheet material as the material is unrolled from the roller by the unrolling means.

31. The apparatus of claim 30 wherein the storing means further comprises sensing means coupled to sense the position of the dancer for sensing when a predetermined length of the material has been stored in the loop, the sensing means being operably connected to the unrolling means for control thereof.

32. An apparatus for manufacturing molded packings comprising:
a mold;
a preparation station having means for delivering a sheet of thin material to the mold to serve as a release agent, the delivering means comprising means for unrolling a portion of sheet material from a supply roll, said portion having a leading edge, means for storing a length of the material unrolled by the unrolling means, means for holding the sheet material in the vicinity of the leading edge and for advancing the leading edge to the mold, a plurality of tracks separable between open and closed positions such that the tracks grip the advanced material when in said closed position, said tracks being movable to draw a predetermined length of the sheet material from the storing means, means for cutting the predetermined length of the material off from the supply roll to form a separator sheet, and means for inserting the cut separator sheet into the mold.

33. An apparatus for delivering and transferring a sheet of thin material having a leading edge from a supply roll to a sheet processing machine comprising:
means for unrolling the material from the roll;
means for releasably holding the material in the vicinity of the leading edge at a location therealong;
means for releasably gripping the sheet material in the vicinity of its leading edge and at a place that is displaced therealong relative to said location;
means for causing relative movement between the releasably holding means and said gripping means so as to bring the sheet in operative engagement with the gripping means;
means for moving said gripping means to deliver a length of said sheet material to a desired location; and
means for severing said sheet material from said delivered length while said sheet material is held by the releasably holding means and form a new leading edge held thereby.

34. The apparatus as claimed in claim 32 wherein said releasably gripping means comprises:
at least two spaced apart pairs of conveyor belts, with the belts in each pair being separable between sheet gripping and sheet releasing positions, the belts having a length selected to bring the sheet material to the desired location.

35. The apparatus as claimed in claim 34 wherein said releasably holding means holds the sheet material at spaced apart location, and wherein said pairs of conveyor belts are arranged to grip the sheet material at places that are displaced relative to said locations along the leading edge.

36. The apparatus as claimed in claim 33 and further including:
means for storing a length of said sheet material after it has been unrolled from the supply roll.

37. The apparatus as claimed in claim 34 wherein the releasably gripping means includes:
means for moving a belt in each pair to separate or close the belts in a pair;
and wherein the releasably holding means includes:
pairs of separable elements and means for moving an element in each pair between sheet releasing and sheet gripping positions.

38. The apparatus as claimed in claim 37 wherein said severing means is positioned between the releasably holding means and the belts.

* * * * *